US012138963B2

(12) United States Patent
Speziari et al.

(10) Patent No.: US 12,138,963 B2
(45) Date of Patent: Nov. 12, 2024

(54) WINTER TYRE

(71) Applicant: PIRELLI TYRE S.P.A., Milan (IT)

(72) Inventors: Diego Speziari, Milan (IT); Vito Bello, Breuberg (DE); Stefano Montesello, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 130 days.

(21) Appl. No.: 16/304,234

(22) PCT Filed: Jun. 6, 2017

(86) PCT No.: PCT/IB2017/053323
§ 371 (c)(1),
(2) Date: Nov. 23, 2018

(87) PCT Pub. No.: WO2017/212399
PCT Pub. Date: Dec. 14, 2017

(65) Prior Publication Data
US 2020/0317004 A1    Oct. 8, 2020

(30) Foreign Application Priority Data

Jun. 10, 2016  (IT) ........................ 102016000059988

(51) Int. Cl.
*B60C 11/12*  (2006.01)
*B60C 11/03*  (2006.01)

(52) U.S. Cl.
CPC ...... *B60C 11/1218* (2013.01); *B60C 11/0302* (2013.01); *B60C 11/1236* (2013.01); *B60C 2011/1213* (2013.01)

(58) Field of Classification Search
CPC ............ B60C 11/1218; B60C 11/0302; B60C 11/1236; B60C 2011/1213; B60C 11/13; B60C 11/11; B60C 5/00; B29D 30/06
See application file for complete search history.

(56) References Cited

U.S. PATENT DOCUMENTS 8,925,600 B2 *  1/2015  Trombin ............. B60C 11/1218
                                                152/209.18
9,539,863 B2   1/2017  Furusawa et al.
(Continued)

FOREIGN PATENT DOCUMENTS

CN   103129324 A    6/2013
CN   103429441 A    12/2013
(Continued)

OTHER PUBLICATIONS

Chinese Office Action for Chinese Application No. 201780034211.9 filed on behalf of Pirelli Tyre SPA. Notification date: Apr. 13, 2020. 7 pages.
(Continued)

*Primary Examiner* — Christopher M Rodd
*Assistant Examiner* — Shibin Liang
(74) *Attorney, Agent, or Firm* — Steinfl + Bruno LLP

(57) ABSTRACT

A tyre with a tread band having a plurality of blocks. The blocks include three-dimensional sipes extending in a direction incident to an advance direction of the tyre. Each sipe separates a block into a first block portion having a first surface facing the advance direction, and into a second block portion having a second surface facing the direction counter to the advance direction. Male/female couplings are provided between the first and the second block portions, the couplings formed by protuberances on the first surface and extending towards the second block portion, and by recesses on the second surface and extending away from the first block portion. The protuberances formed on the first surface have an apex that is spaced apart from the tread surface by no more than 40% of the depth of the three-dimensional sipe, measured at the apex.

22 Claims, 2 Drawing Sheets

(56) References Cited

U.S. PATENT DOCUMENTS

| | | | |
|---|---|---|---|
| 2002/0170643 A1 | | 11/2002 | Kuze |
| 2009/0223613 A1* | | 9/2009 | Saeki .................... B60C 11/124 |
| | | | 152/209.18 |
| 2011/0315290 A1 | | 12/2011 | Nagayasu |
| 2015/0191051 A1* | | 7/2015 | Nagayasu ........... B60C 11/1263 |
| | | | 152/209.21 |

FOREIGN PATENT DOCUMENTS

| | | | |
|---|---|---|---|
| JP | 2004243644 A | 9/2004 | |
| JP | 2004-314758 A | 11/2004 | |
| JP | 2008087648 A | 4/2008 | |
| JP | 2014-046743 A | 3/2014 | |
| WO | 2012/127332 A1 | 9/2012 | |

OTHER PUBLICATIONS

International Search Report for International Application No. PCT/IB2017/053323 filed Jun. 6, 2017 on behalf of Pirelli Tyre S.P.A. Mail date: Sep. 18, 2017. 4 pages.

Written Opinion for International Application No. PCT/IB2017/053323 filed Jun. 6, 2017 on behalf of Pirelli Tyre S.P.A. Mail date: Sep. 18, 2017. 6 pages.

Extended European Search Report for EP Application No. 20200114 filed on Jun. 6, 2017 on behalf of Pirelli Tyre S.P.A. Mail Date: Nov. 30, 2020 6 pages.

* cited by examiner

WINTER TYRE

CROSS REFERENCE TO RELATED APPLICATIONS

The present application is the U.S. national stage of International Patent Application PCT/IB2017/053323 filed internationally on Jun. 6, 2017 which, in turn, claims priority to Italian application 102016000059988 filed on Jun. 10, 2016.

The present invention relates to a tyre, in particular a winter tyre.

A tyre generally comprises a carcass structure that is toroidally formed about an axis of rotation and to which there are applied, in a radially external position, a belt structure and, further overlapping said structure, a tread band made of elastomeric material, on which there is defined a tread surface intended to contact with the road surface.

A plurality of grooves having a circumferential and/or transverse extent are typically defined in the tread band, which grooves delimit a corresponding number of blocks, all together defining the tread pattern of the tyre.

The features of the tread band, and in particular the number and configuration of the grooves and of the blocks provided in the tread surface, primarily determine the performance of the tyre in terms of behaviour on the road, in particular in relation to the possible varying conditions of the road surface itself.

In order to improve the grip of a tyre on snow-covered ground, small sipes that extend from the tread surface of the tyre towards the inside of the blocks can be formed in the blocks of the tread band. The function of the sipes is to provide other elements intended to grip the snow-covered ground and to hold some amount of snow, thus improving the adherence to the snow-covered road surface.

However, the presence of sipes in the blocks of the tread band can reduce the performance of the tyre when the road surface is not covered by snow, be said road surface dry or wet, as a result of the reduced ability of the blocks to sufficiently resist the shear stresses when accelerating, braking or driving bends.

A tyre is defined as being a "directional" tyre when it is configured to have a preferred rolling direction, which typically coincides with the direction of rotation of the tyre when mounted on a vehicle travelling forwards.

An "advance direction", which is tangential to the tread surface and directed in the preferred rolling direction of the tyre, is identified on the tread surface of a directional tyre.

An "equatorial plane" of the tyre is intended to mean the axially central plane that is perpendicular to the axis of rotation of said tyre.

The term "effective width" relating to the tread band is intended to mean the width of the radially outermost portion of the tread band (from edge to edge) that is intended to make contact with the ground.

The "central region" of the tread band is intended to mean a region of the tread surface that is centred on the equatorial plane of the tyre and extends by an amount of up to 60% of the effective width of the tread band.

The "shoulder regions" identify the regions of the tread surface extending from the axially opposite ends of the tread band to the central region, symmetrically with respect to the equatorial plane of the tyre.

The term "groove" refers to a cavity made in the tread surface, which has at least one portion having a width of at least 1.5 mm. Said groove preferably has a minimum depth of around 5 mm.

The term "sipes" meanwhile refers to a cavity made in a tread band portion that has a width of between about 0.1 mm and 1.5 mm.

Each sipe separates the block in which it is formed into two block portions having respective surfaces that face one another.

These surfaces extend along a respective "reference plane" that is incident to the tread surface and coincides with the surface net of possible protuberances and recesses. A "longitudinal direction", which is substantially parallel to the tread surface, and a "transverse direction", which is substantially perpendicular to the longitudinal direction, remain defined on the reference plane. If the reference plane extends in a direction that is substantially perpendicular to the tread surface, the transverse direction coincides with a radial direction of the tyre.

A surface of a block portion defined by a sipe is considered "to face in the advance direction" if a straight line that is perpendicular to the surface and is oriented such that it leaves the associated block portion defines an angle of less than 60° with the advance direction.

A sipe is defined as being a "three-dimensional" sipe if at least one of the surfaces of the block portions, which surfaces face one another, comprises at least one protuberance, while the other surface comprises a corresponding recess for receiving said protuberance at least in part.

In other words, the respective projections of the two block portions that are separated by the sipe, in a transverse direction of each reference plane, overlap, at least in part, at the protuberance and the corresponding recess.

In this way, relative displacement of the two block portions in a direction that is parallel to the reference plane is prevented by the interference between the two block portions at the protuberance and the recess.

A sipe is defined as being a "simple" sipe if no protuberances and/or recesses that interfere with one another during the relative movement of the two block portions in a direction that is parallel to the reference plane are provided on the surfaces of the block portions that face each other.

The distance between surfaces of respective block portions facing one another at a block is defined as being "substantially constant" along the sipe extent if the distance between these surfaces is in a range of more or less 50% of the average value of the distance, calculated over the entire extent of the sipe.

A "substantially flat" connecting surface indicates a surface that is flat for at least 50% of the extent thereof.

An "apex" of a protuberance refers to the point or points of the protuberance that are at the furthest distance from the reference plane.

An example of a winter tyre, in the blocks of which are formed three-dimensional sipes, is described in international patent application WO 2012/127332 in the name of the same applicant.

First of all, the applicant has verified that the provision of three-dimensional sipes in the blocks increases their rigidity when subjected to shear stresses, thus improving the performance of the tyre on dry or wet ground just as much when braking as during traction control and during driving bends.

In particular, the applicant has observed that the rigidity of a block increases as the interference between the block portions increases and therefore as the dimensions and number of protuberances made on the respective surfaces increases.

At the same time, however, the applicant has verified how this increase in rigidity of the block due to the provision of three-dimensional sipes, corresponds to reduced mobility of the adjacent block portions, consequently reducing the efficiency of holding the snow and therefore the performance of the tyre on snow-covered ground.

In this context, the applicant felt the need to provide a tread pattern for improving the performance of the tyre on snow-covered ground as well as the general performance on dry or wet ground.

The applicant has perceived that this aim can be achieved by configuring the three-dimensional sipes so that the block portions separated by said sipes have a different degree of deformability, so that the tangential stresses exerted on the block during acceleration cause the sipe to open to a greater extent and, in contrast, the tangential stresses exerted on the block during breaking lead to an improvement in the mutual blocking of the block portions, causing a more effective closure of the sipe itself.

Finally, the applicant has found that a three-dimensional sipe on which all the protuberances extend from the block portion facing the advance direction of the tyre and the corresponding recesses extend on the mutually opposing block portion—these protuberances and recesses being arranged at a relatively reduced distance from the tread surface—defines a "lip" element on the block portion in which the recesses are made, said lip element being arranged between the recesses and the tread surface. This element is more deformable than the remaining part of the block portion and acts as an element for opening and closing the sipe during acceleration and during braking, respectively.

In particular, in a first aspect, the invention relates to a tyre having a tread band, on which a plurality of grooves, a plurality of blocks delimited by said plurality of grooves and a plurality of three-dimensional sipes formed in at least one block of said plurality of blocks are defined.

Preferably, said three-dimensional sipes are open on a tread surface that is radially external relative to said tread band.

Preferably, said three-dimensional sipes extend in a direction that is incident to an advance direction defined on said tread surface.

Preferably, each of said three-dimensional sipes of said plurality of sipes separates said at least one block into a first block portion comprising a first surface and into a second block portion comprising a second surface.

Preferably, said first surface extends along a reference plane that is incident to said tread surface. Preferably, said first surface faces in said advance direction.

Preferably, said second surface faces said first surface.

Preferably, said second surface extends along a reference plane that is incident to said tread surface.

Preferably, said second surface faces in the opposite direction to said advance direction.

Preferably, a plurality of male/female couplings are provided between said first block portion and said second block portion.

Preferably, all the male/female couplings between said first block portion and said second block portion are formed by a plurality of protuberances that are formed on said first surface and extend from said reference plane towards said second block portion, and by a plurality of recesses that are formed in said second surface and extend from said reference plane away from said first block portion.

Preferably, said protuberances provided on said first surface have an apex that is spaced apart from said tread surface of a measure of no more than 40% of the depth of said three-dimensional sipe measured at said apex.

The provision of three-dimensional sipes having the features indicated above determines a lip element on the block portion in which the recesses are defined, which lip element is more deformable than both the adjacent regions of the block portion and the block portion on which the protuberances are formed.

In this way, when the block is subjected to shear stresses in the advance direction of the tyre, for example during acceleration, the lip element, by deforming, moves in the advance direction by a greater amount than the other block portion that delimits the sipe, thus increasing the opening of said sipe.

Similarly, when the block is subjected to shear stresses in the opposite direction to the advance direction of the tyre, for example when braking, the lip element, by deforming, moves in this direction by a greater amount than the other block portion that delimits the sipe so as to reduce the size of the opening thereof, potentially until it is closed.

In the above-mentioned aspect, the present invention may comprise at least one of the preferred features indicated below, taken either in isolation or in combination.

According to a preferred embodiment, said protuberances have a pyramidal shape and said apex is connected to said reference plane by substantially flat connecting surfaces.

Preferably, said protuberances have a pyramidal shape, having a quadrilateral plan having a first and a second pair of adjacent sides that are substantially equal to one another, and a longer diagonal and a shorter diagonal that are perpendicular to each other.

Preferably, said longer diagonal extends in a direction that is substantially perpendicular to said tread surface and said shorter diagonal extends in a direction that is substantially parallel to said tread surface.

Preferably, the sides of said first pair preferably measure less than the sides of said second pair and they joined together at an upper vertex of said protuberance which faces said tread surface.

The features mentioned above, taken in isolation or in combination, define a shape of the protuberances that advantageously makes it possible not to excessively weaken the block portion in which the recesses are made at the lip element, despite the protuberances being positioned near to the tread surface.

In addition, this shape of the protuberances makes it easier to extract the tyre from the vulcanisation mould.

In a preferred embodiment of the invention, said upper vertex is at a distance from said tread surface having a measure less than 2 mm. Preferably said measure is about 1 mm.

This maximises the deformability of the lip element and consequently the action of opening and closing the opening of the sipe following acceleration or braking.

Preferably, the sides of said second pair join together at a lower vertex of said protuberance that faces a bottom part of said sipe on the side that is opposite said tread surface.

Preferably, said lower vertex is at a distance from said bottom part of said sipe having a measure of less than 2 mm, most preferably of about 1 mm.

In a preferred embodiment, the sides of said first pair are joined to the sides of said second pair at respective lateral vertices that are at a distance from one another of between about 2 mm and about 5 mm, most preferably by about 3 mm.

Preferably, said apex is positioned at a distance from said tread surface of no more than about 3 mm, most preferably at a distance of about 2 mm.

Preferably, said apex is at a distance from said reference plane measuring between about 1 mm and about 2 mm.

Preferably, said apex is at a distance from said reference plane having a measure of no more than 30% of the depth of said sipe measured at said apex.

In this way, a lip element is defined on the block portion in which the recesses are made, which lip element can be sufficiently deformed so as to make it possible to effectively open and close the opening of the sipe, without, however, excessively weakening the block portion.

Preferably, said first surface has no recesses.

Preferably, said first and second surface are substantially parallel to one another such that the distance between said first and second surface is substantially constant along the extent of said three-dimensional sipe.

Preferably, at least three protuberances are formed on said first surface. In a preferred embodiment, five protuberances are formed on said first surface.

Thanks to this feature, the increased performance effectiveness of a single protuberance is significantly increased and is extended over a larger longitudinal dimension, typically over the entire longitudinal extent of the block.

Preferably, said at least one three-dimensional sipe is open on said tread surface and has a zig-zag course.

In a preferred embodiment of the invention, said three-dimensional sipes made in said at least one block extend on the tread surface in substantially parallel directions, and subdivide said at least one block into portions having circumferential dimensions that are substantially equal to one another.

In this way, each block has mechanical features (in particular resistance to shear stresses) that are substantially homogeneous at the various portions into which each block is divided by the three-dimensional sipes.

Preferably, said plurality of sipes is formed on a shoulder region of said tread band.

Preferably, on a central region of said tread band that is comprised between axially opposite shoulder regions, blocks are preferably provided that have only simple sipes.

Preferably, said reference plane is perpendicular to said tread surface.

The features and advantages of the invention will become clearer from the detailed description of a preferred embodiment thereof, illustrated by way of non-restrictive example, with reference to the accompanying drawings, in which.

Figure 1:
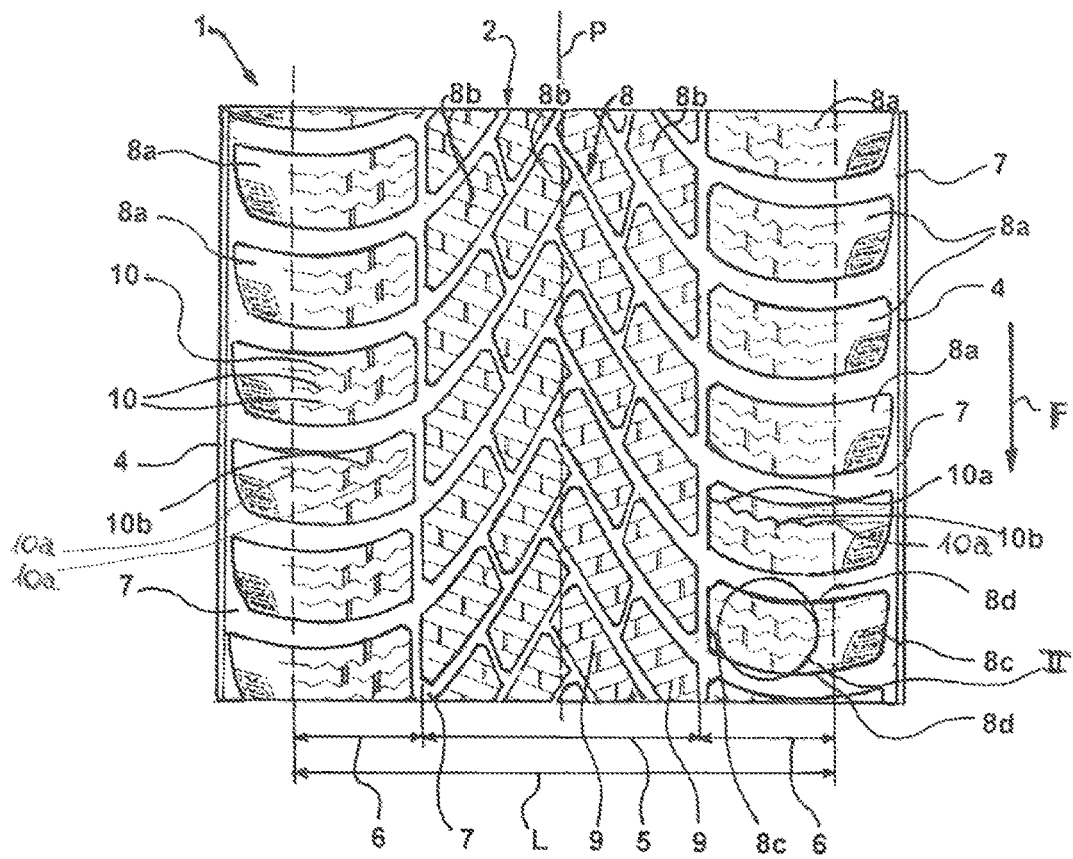
FIG. 1 is a schematic view of a tread band portion, developed on a plane, of a tyre realized in accordance with the present invention.
Figure 2:
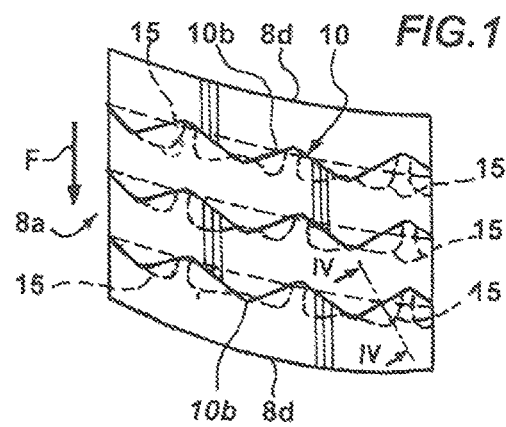
FIG. 2 is an enlarged view of a zone of the tread band portion of FIG. 1 indicated by II, including a block having three-dimensional sipes.
Figure 3B:
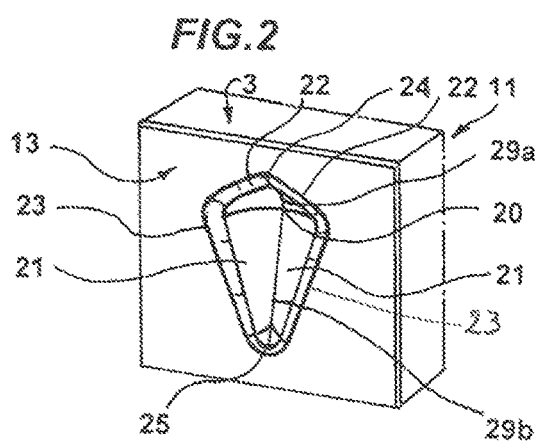
FIGS. 3a and 3b are a front view and a perspective view, respectively, of a portion of a first surface defined by a three-dimensional sipe in the block of FIG. 2.
Figure 3A:
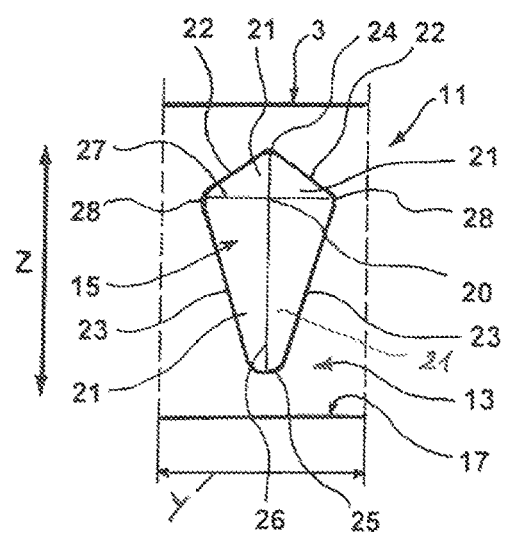
Figure 4:
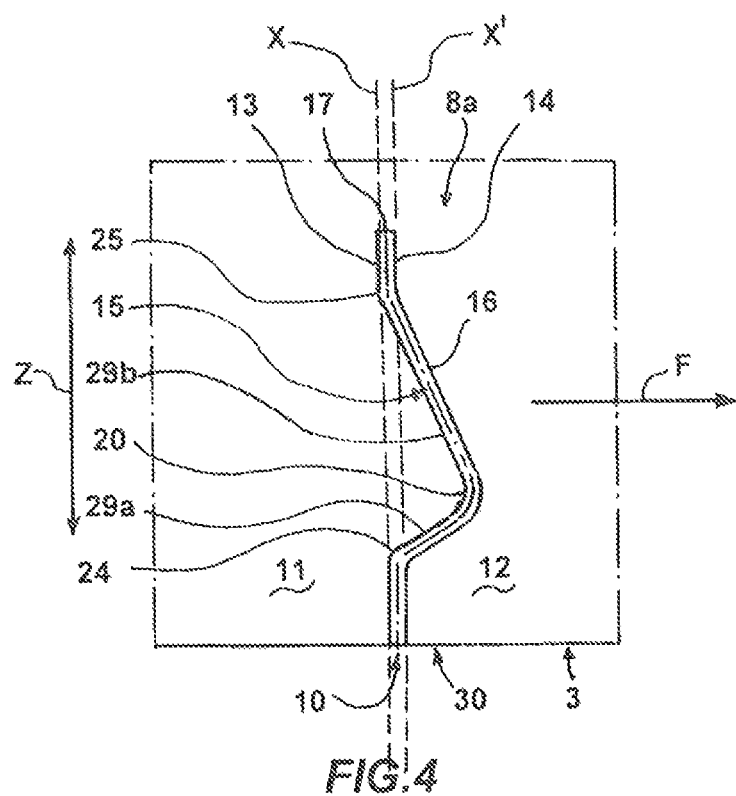
FIG. 4 is a cross-sectional enlarged view along the line IV-IV of the block of FIG. 2.

With reference to the attached figures, reference numeral 1 indicates a tyre as a whole, which is formed in accordance with the present invention.

The tyre 1 has a tyre structure, which is conventional per se and is not shown in the appended figures, and a tread band 2, positioned radially externally with respect to the tyre 1 and on which a tread surface 3 is defined.

The portion of tread band 2 specifically intended to come into contact with the road surface extends axially so as to define an effective width L, and is connected at the axially opposite ends thereof to the flanks 4 of the tyre 1.

A central region 5 of the tread band 2, which region extends symmetrically about an equatorial plane P of the tyre, and two shoulder regions 6 that are adjacent to the central region 5 and arranged axially symmetrically about the central region, are also be identified inside the effective width L of the tread band.

A plurality of grooves, all generally indicated by reference numeral 7, are formed in the tread band 2, which grooves delimit a plurality of blocks 8 arranged in succession along a circumferential extent of the tread band 2.

In particular, a first plurality of blocks 8a, formed in each of the shoulder region 6, and a second plurality of blocks 8b formed in the central region 5 of the tread band 2 are identified.

Each block 8a is delimited by first edges 8c that are axially opposite one another, and by second edges 8d that are circumferentially opposite one another.

As a whole, the blocks 8 and the grooves 7 briefly described above define the tread pattern of the tyre 1 and are configured so as to define a preferred rolling direction thereof.

The tyre 1 is therefore a directional tyre, on which an advance direction F remains defined.

Simple sipes 9 and/or three-dimensional sipes 10 are formed in each block 8, which sipes are open on the tread surface 3 and extend in a direction that is incident to the advance direction F.

In particular, in the preferred example described here, each block 8a made in a shoulder region 6 comprises three-dimensional sipes 10, whereas each block 8b made in the central region 5 of the tread band 2 comprises simple sipes 9.

The three-dimensional sipes 10 extend in the sipes 8a in directions that are substantially parallel to one another and, preferably, also substantially parallel to the second edges 8d.

The three-dimensional sipes 10 are preferably at a substantially equal distance from one another and from the second edges 8d so as to divide each block 8a into portions having substantially equal circumferential dimensions.

The three-dimensional sipes 10 preferably have a substantially rectilinear course at opposite ends 10a and a zig-zag course (a broken line course) at a central zone 10b.

Each three-dimensional sipe 10 separates the associated block 8a into a first and a second block portion, indicated by reference numerals 11 and 12, respectively, which have a first surface 13, facing in the advance direction F, and a second surface 14, facing the first surface 13 and facing in the opposite direction to the advance direction F, respectively.

Each of the first and second surfaces 13 and 14 intersects the tread surface 3 so defining a longitudinal direction Y of the three-dimensional sipe 10, and extends inside the tread band 2 along a reference plane, which is substantially perpendicular to the tread surface 3. For the sake of clarity, in the figures the reference plane of the first surface 13 is indicated by X, while the reference plane of the second surface 14 is indicated by X'.

In this way, both the longitudinal direction Y, which is substantially parallel to the tread surface 3, and a transverse direction Z, which is substantially perpendicular to the longitudinal direction Y and is parallel to a radial direction of the tyre 1, are uniquely defined on the reference plane X, X'.

It is evident that, in the central zone 10b in which the sipe has a zig-zag course, the reference plane X, X' is formed by several reference planes that are adjacent to one another, each of which can be considered independently in relation to the features of the sipe that are specified in the following.

At the ends 10a, the three-dimensional sipe 10 has a dimension in the transverse direction Z, i.e. a depth, that is smaller than the depth at the central zone 10b. In particular, at the ends 10a the depth is about 2 mm, while at the central zone said depth is about 7 mm.

The first and the second surface 13, 14 are substantially parallel to one another such that the distance therebetween is substantially constant along the extent of the three-dimensional sipe 10. The distance between the first and the second surface 13, 14 is preferably about 0.3 mm.

The first surface 13 comprises a plurality of protuberances 15 extending from the reference plane X towards the second block portion 12, while the second surface 14 comprises a corresponding number of recesses 16 that extend from the respective reference plane X' and away from the first block portion 11, and are shaped so as to couple to the protuberances 15, at least in part, thus forming a respective plurality of male/female couplings.

Due to the provision of these male/female couplings between the first block portion 11 and the second block portion 12, the sipe 10 is a three-dimensional sipe.

Preferably, all the male/female couplings provided between the first block portion 11 and the second block portion 12 are realized by protuberances 15 formed on the first surface 13 and by corresponding recesses 16 formed in the second surface 14.

Most preferably, all the protuberances 15 of the sipe 10 are made on the first surface 13 such that the second surface 14 does not comprise protuberances, and, in an equally preferred manner, all the recesses 16 are made in the second surface 14 such that the first surface 13 does not comprise any recesses.

In the preferred embodiment shown here, the protuberances 15 are formed on the first surface 13 in the central zone 10b of the sipe 10, in which zone said sipe has a zig-zag course comprising adjacent reference planes X that are inclined with respect to one another.

The protuberances 15 are preferably arranged, in succession, such that there is one for each adjacent reference plane, thus forming the zig-zag course of the sipe 10.

At least three protuberances are provided for each three-dimensional sipe 10.

In a preferred embodiment, each sipe 10 comprises five protuberances.

The protuberances 15 are substantially identical and each have a pyramidal shape on which an apex 20 is identified.

The protuberances 15 are positioned close to the tread surface 3 and, in particular, the apex 20 is spaced apart from said tread surface by no more than 40%, preferably by about 30%, of the depth of the sipe 10, measured at the apex 20.

In addition, the apex 20 is spaced apart from the reference plane X by no more than 30% of the depth of the sipe 10, measured at the apex 20. Said apex is preferably spaced apart from the reference plane X by an amount that is equal to about 20% of said depth.

In the embodiment described here, the depth of the sipe 10, measured at the apex 20, is about 7 mm, for which reason the distance between the apex 20 and the tread surface 3 and the distance between said apex and the reference plane X are no greater than about 3 mm and about 2 mm, respectively.

The apex 20 is preferably spaced apart from the tread surface 3 by about 2 mm and from the reference plane X by between about 1 mm and about 2 mm, preferably by about 1.5 mm.

It is noted that the distance between the apex 20 and the reference plane X is greater than the distance between the first and second surfaces 13, 14, such that a possible relative displacement of the first block portion 11 with respect to the second block portion 12 in the transverse direction Z is prevented by the interference of the protuberances 15 with the walls of the recesses 16.

Each protuberance 15 preferably has a pyramidal shape, having a quadrilateral base in which the apex 20 is connected to the reference plane X, at the quadrilateral base, by means of four substantially planar connecting surfaces 21.

The quadrilateral base comprises a first pair of sides 22, which are adjacent and substantially equal to one another and face the tread surface 3, and a second pair of sides 23, which are adjacent and substantially equal to one another and face the bottom part 17 of the three-dimensional sipe 10. The sides 22 of the first pair are joined to one another at an upper vertex 24 of the protuberance 15 that faces the tread surface 3.

The upper vertex 24 is the point of the protuberance 15 that is closest to the tread surface 3, and is at a distance of less than 2 mm, preferably about 1 mm, therefrom.

The sides 23 of the second pair are joined to one another at a lower vertex 25 of the protuberance 15, which vertex faces the bottom part 17 of the sipe 10, on the side opposite the tread surface 3.

The lower vertex 25 is the point of the protuberance 15 that is closest to the bottom part 17 of the sipe 10 and is spaced apart therefrom by less than 2 mm, preferably about 1 mm.

The sides 22 of the first pair are shorter than the sides 23 of the second pair, so that the apex 20 is closer to the upper vertex 24 than to the lower vertex 25.

A longer diagonal 26 and a shorter diagonal 27, which are perpendicular to one another, are also defined on the quadrilateral base of the protuberance 15.

The longer diagonal 26 preferably extends in the transverse direction Z so as to be substantially perpendicular to the tread surface 3, while the shorter diagonal 27 extends in the longitudinal direction Y so as to be substantially parallel to the tread surface 3.

The sides 22 of the first pair are joined to the sides 23 of the second pair at respective lateral vertices 28, which are spaced apart by between about 2 mm and about 5 mm, preferably about 3 mm.

The apex 20 is also connected to the upper apex 24 and to the lower apex 25 by a first ridge 29a and by a second ridge 29b, which are defined by the point where respective pairs of connecting surfaces 21 join.

The first ridge 29a is inclined with respect to the reference plane X by an angle of about 60°, whilst the second ridge 29b is inclined with respect to the reference plane X by an angle of about 20°.

The recesses 16 made in the second surface 14 have a similar shape that corresponds to the protuberances 15.

The configuration of the three-dimensional sipe 10 described above in detail defines, on the second block portion 12 in which the recesses 16 are made, a lip element 30 that is defined between the upper part of the recesses 16 and the tread surface 3.

The lip element 30 has a greater degree of deformability than the remaining part of the block 8a and, in particular, has a greater degree of deformability than the first block portion 11 at the opening of the sipe 10.

Thanks to this feature, when the block 8a is subjected to shear stress oriented in accordance with the advance direction F, the lip element 30, which has a greater degree of deformability, moves by a greater extent than the first block portion 11, so that the opening of the sipe 10 is greater than the distance between the first and the second surface 13, 14 under normal conditions (i.e. without shear stresses).

Figure 5:
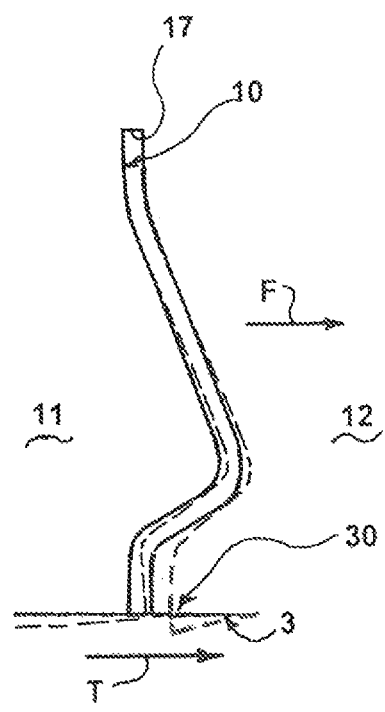

This situation is illustrated schematically in FIG. 5, in which the position of the first and of the second block portion 11 and 12 at the sipe 10 in the absence of shear stress is represented by a continuous line, while the position of the first and of the second block portion 11 and 12 at the sipe 10 in the presence of shear stress T concordant with the advance direction F is represented by a dashed line.

Similarly, when the block 8a is subjected to shear stress oriented in a direction counter to the advance direction F, the lip element 30 tends to close the opening of the sipe 10 by moving by a greater extent than the first block portion 11.

Figure 6:
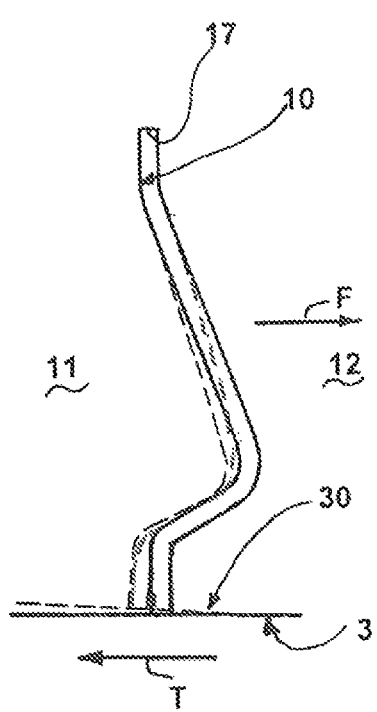
FIGS. 5 and 6 are similar views to FIG. 4, illustrating the behaviour of the block during acceleration and during braking, respectively.

This situation is illustrated schematically in FIG. 6, in which the position of the first and of the second block portion 11 and 12 at the sipe 10 in the absence of shear stress is represented by a continuous line, while the position of the first and of the second block portion 11 and 12 at the sipe 10 in the presence of shear stress T oriented in a direction counter to the advance direction F is represented by a dashed line.

EXAMPLE

The applicant has subjected a tyre of size 205/55R16, formed according to the invention, to acceleration, braking and road handling tests on different road surfaces (snow-covered, wet and dry) and compared the results thereof with a comparison tyre that is very similar in terms of dimensions, compound and tread pattern, but with blocks provided with three-dimensional sipes of the type described in international patent application WO 2012/127332.

The results obtained from the tests are set out in the following table, table 1, in which the comparison tyre is indicated as tyre A, and the tyre of the invention is indicated as tyre B.

| Parameter | Traction | Braking | | Handling | | Aquaplaning | |
|---|---|---|---|---|---|---|---|
| Road surface | snow | snow | dry | dry | wet | rectilinear | curved |
| Tyre A | 100 | 100 | 100 | 100 | 100 | 100 | 100 |
| Tyre B | 103 | 100 | 104 | 100 | 103 | 102 | 104 |

The results in table 1 show a distinct improvement in the traction performance during traction control on a snow-covered road surface and when braking on dry road surface.

In addition, the performance offered by the tyre according to the invention has been found to be considerably better in terms of both aquaplaning and handling when the road surface is wet.

In addition, the application has shown that the provision of three-dimensional sipes in the blocks, which sipes are formed in accordance with the present invention, does not entail particular difficulties in the extraction of the tyre from the moulds when vulcanising and moulding said tyre.

The invention claimed is:
1. A tyre comprising a tread band, the tread band comprising:
a plurality of grooves;
a plurality of blocks delimited by the plurality of grooves;
a plurality of three-dimensional sipes formed in at least one block of the plurality of blocks, the three-dimensional sipes being open on a tread surface that is radially external to the tread band and extending in a direction that is incident to a forward direction defined on the tread surface;
wherein each sipe of the plurality of three-dimensional sipes separates the at least one block into:
a first block portion comprising a first surface extending along a reference plane that is incident to the tread surface and facing in the forward direction, and
a second block portion comprising a second surface extending along a reference plane that is incident to the tread surface, the second surface being opposite the first surface and facing away from the forward direction,
wherein:
a plurality of male/female couplings are provided between the first block portion and the second block portion,
the plurality of male/female couplings consist of all the male/female couplings provided between the first block portion and the second block portion,
the plurality of male/female couplings are formed by:
a plurality of protuberances that are all formed on the first surface and extend from the reference plane towards the second block portion, and
a plurality of matching recesses, each matching a corresponding protuberance of the plurality of protuberances, the matching recesses being all formed in the second surface and extending from the reference plane away from the first block portion,
each protuberance of the plurality of protuberances has an apex that is at a distance from the tread surface of no more than 40% of a depth of a sipe of the plurality of three-dimensional sipes measured at the apex,
each protuberance of the plurality of protuberances has a pyramidal shape comprising:
a quadrilateral base on the first surface having a first pair of adjacent sides of substantially equal length and a second pair of adjacent sides of substantially equal length;
the quadrilateral base having a longer diagonal and a shorter diagonal that is perpendicular to the longer diagonal, the longer diagonal being longer than the shorter diagonal;
the adjacent sides of the first pair of adjacent sides:
are shorter than the adjacent sides of the second pair of adjacent sides, and
join at an upper vertex of a protuberance of the plurality of protuberances that faces the tread surface, and
the adjacent sides of the second pair of adjacent sides join at a lower vertex of said protuberance that faces a bottom part of the sipe, on a side opposite the tread surface.

2. The tyre according to claim 1, wherein, for each protuberance, the apex is connected to the reference plane by substantially flat connecting surfaces.

3. The tyre according to claim 2, wherein:
the longer diagonal extends in a direction substantially perpendicular to the tread surface, and
the shorter diagonal extends in a direction substantially parallel to the tread surface.

4. The tyre according to claim 1, wherein the upper vertex is at a distance from the tread surface that is less than 2 mm.

5. The tyre according to claim 4, wherein the upper vertex is at a distance from the tread surface that is less than 1 mm.

6. The tyre according to claim 1, wherein the lower vertex is at a distance from the bottom part of the sipe that is less than 2 mm.

7. The tyre according to claim 6, wherein the lower vertex is at a distance from the bottom part of the sipe that is less than 1 mm.

8. The tyre according to claim 7, wherein the adjacent sides of the first pair of adjacent sides are joined to the adjacent sides of the second pair of adjacent sides at respective lateral vertices that are at a distance from one another in a range between 2 mm and 5 mm.

9. The tyre according to claim 8, wherein the adjacent sides of the first pair of adjacent sides are joined to the adjacent sides of the second pair of adjacent sides at respective lateral vertices that are at a distance from one another that is about 3 mm.

10. The tyre according to claim 8, wherein the apex is positioned at a distance from the tread surface of no more than about 3 mm.

11. The tyre according to claim 10, wherein the apex is positioned at a distance from the tread surface of no more than about 2 mm.

12. The tyre according to claim 10, wherein the apex is at a distance from the reference plane in a range between 1 mm and 2 mm.

13. The tyre according to claim 12, wherein the apex is at a distance from the reference plane of no more than 30% of the depth of the sipe measured at the apex.

14. The tyre according to claim 13, wherein the first surface is devoid of any recess.

15. The tyre according to claim 14, wherein the first and second surfaces are substantially parallel to one another, so that a distance between the first and second surfaces is substantially constant along an extent of the sipe.

16. The tyre according to claim 1, wherein at least three protuberances are formed on the first surface.

17. The tyre according to claim 1, wherein at least one sipe of the plurality of sipes is open on the tread surface and has a zigzag course that contains at least one protuberance of the plurality of protuberances.

18. The tyre according to claim 1, wherein the plurality of three-dimensional sipes extend over the tread surface in substantially parallel directions and subdivide the at least one block into portions having circumferential dimensions that are substantially equal to one another.

19. The tyre according to claim 1, wherein the plurality of blocks is formed on a shoulder region of the tread band.

20. The tyre according to claim 1, wherein
the tread band comprises a central region provided with central region sipes, wherein all said central region sipes consist of simple two-dimensional sipes, the central region being between axially opposite shoulder regions, wherein all the three-dimensional sipes of said plurality of three-dimensional sipes are comprised in said axially opposite shoulder regions.

21. The tyre according to claim 1, wherein:
the first surface has a first degree of deformability at the tread surface, and
the plurality of recesses in the second surface define a lip element on the second block portion at the tread surface, the lip element having a second degree of deformability greater than the first degree of deformability, configured to enlarge a distance at the tread surface between the first surface and the second surface in presence of shear stress in the forward direction and reduce the distance at the tread surface between the first surface and the second surface in presence of shear stress opposite to the forward direction.

22. The tyre of claim 1, wherein
each protuberance of the plurality of protuberances is a single protuberance in a radial direction of the tyre corresponding to said each protuberance, and
each matching recess of the plurality of matching recesses is a single matching recess in the radial direction of the tyre corresponding to said matching recess.

* * * * *